United States Patent [19]
Loewen et al.

[11] Patent Number: 5,555,822
[45] Date of Patent: Sep. 17, 1996

[54] APPARATUS FOR DISSOCIATING BULK WASTE IN A MOLTEN METAL BATH

[75] Inventors: Eric P. Loewen, Oak Ridge, Tenn.; Arthur W. White, Haverhill, Mass.

[73] Assignee: Molten Metal Technology, Inc., Waltham, Mass.

[21] Appl. No.: 301,235

[22] Filed: Sep. 6, 1994

[51] Int. Cl.$^6$ ........................................... F23G 7/00
[52] U.S. Cl. ........................... 110/237; 110/346; 588/201
[58] Field of Search ................................ 110/235, 237, 110/346; 588/201; 423/210.5, DIG. 12

[56] References Cited

U.S. PATENT DOCUMENTS

| | | | |
|---|---|---|---|
| 49,051 | 7/1865 | Bessemer . | |
| 331,267 | 11/1885 | Williamson . | |
| 876,437 | 1/1908 | Carson . | |
| 895,939 | 8/1908 | Baggaley . | |
| 2,002,010 | 5/1935 | Hilliard | 75/22.5 |
| 2,862,810 | 12/1958 | Alexandrovsky | 75/60 |
| 2,923,615 | 2/1960 | Pearce | 75/40 |
| 2,962,277 | 11/1960 | Morrill | 266/36 |
| 3,295,960 | 1/1967 | Parlee et al. | 75/93 |
| 3,486,882 | 12/1969 | Raguin et al. | 75/51 |
| 3,490,897 | 1/1970 | Dore et al. | 75/76 |
| 3,542,352 | 11/1970 | Themelis et al. | 266/36 |
| 3,632,335 | 1/1972 | Worner | 75/63 |
| 3,634,065 | 1/1972 | Worner | 75/46 |
| 3,839,019 | 10/1974 | Bruno et al. | 75/68 R |
| 3,985,549 | 10/1976 | Rheinländer et al. | 75/52 |
| 4,024,056 | 5/1977 | Yarwood et al. | 210/69 |
| 4,062,657 | 12/1977 | Knüppel et al. | 48/77 |
| 4,085,923 | 4/1978 | Queneau et al. | 266/215 |
| 4,175,731 | 11/1979 | Overdeck et al. | 266/142 |
| 4,235,627 | 11/1980 | Dantzig et al. | 75/93 E |
| 4,265,432 | 5/1981 | Lajovic et al. | 266/220 |
| 4,291,634 | 9/1981 | Bergsten et al. | 110/235 |
| 4,373,705 | 2/1983 | Yamada | 266/227 |
| 4,401,466 | 8/1983 | Wells et al. | 75/60 |
| 4,406,666 | 9/1983 | Paschen et al. | 48/92 |
| 4,457,777 | 7/1984 | MacGregor et al. | 75/51 |
| 4,540,432 | 9/1985 | Hirsch et al. | 75/43 |
| 4,574,714 | 3/1986 | Bach et al. | 110/346 |
| 4,602,574 | 7/1986 | Bach et al. | 110/346 |
| 4,627,601 | 12/1989 | Berthet et al. | 266/212 |
| 4,645,186 | 2/1987 | Hanniala | 266/212 |
| 4,666,696 | 5/1987 | Shultz | 423/659 |
| 4,790,516 | 12/1988 | Sugiura et al. | 266/144 |
| 4,798,532 | 1/1989 | Kimura et al. | 432/210 |
| 5,004,495 | 4/1991 | Labate | 75/10.22 |
| 5,015,288 | 5/1991 | Kusik et al. | 75/686 |
| 5,143,355 | 9/1992 | Iwamura et al. | 266/160 |
| 5,192,487 | 3/1993 | Malmström et al. | 266/201 |
| 5,194,081 | 3/1993 | Trevelyan et al. | 65/29 |
| 5,202,100 | 4/1993 | Nagel et al. | 423/5 |
| 5,301,620 | 4/1994 | Nagel et al. | 110/346 |
| 5,359,947 | 11/1994 | Wagner | 110/346 |
| 5,435,814 | 7/1995 | Miller et al. | 48/92 |

OTHER PUBLICATIONS

Howard K. Worner et al., "WORCRA (Continuous) Steelmaking," *Journal of Metals*, pp. 50–56 (Jun., 1969).

*Primary Examiner*—Henry A. Bennett
*Assistant Examiner*—Susanne C. Tinker
*Attorney, Agent, or Firm*—Hamilton, Brook, Smith & Reynolds, P.C.

[57] ABSTRACT

A reactor includes a bulk waste inlet and a gas outlet. A baffle within the reactor has a lower edge which can be immersed by a molten metal bath within the reactor. The baffle partitions are gaseous volume above the molten metal bath into a first region, proximate to the bulk waste inlet, and a second region, proximate to the gas outlet. The gas conduit extends from the first region to a portion of the reactor beneath the second region. Gas is directed from the first region through the gas conduit to a portion of the molten metal bath beneath the second region. The gas pressure is thereby equalized above the molten metal bath in the first and second regions during dissociation of bulk waste directed into the first region.

8 Claims, 1 Drawing Sheet

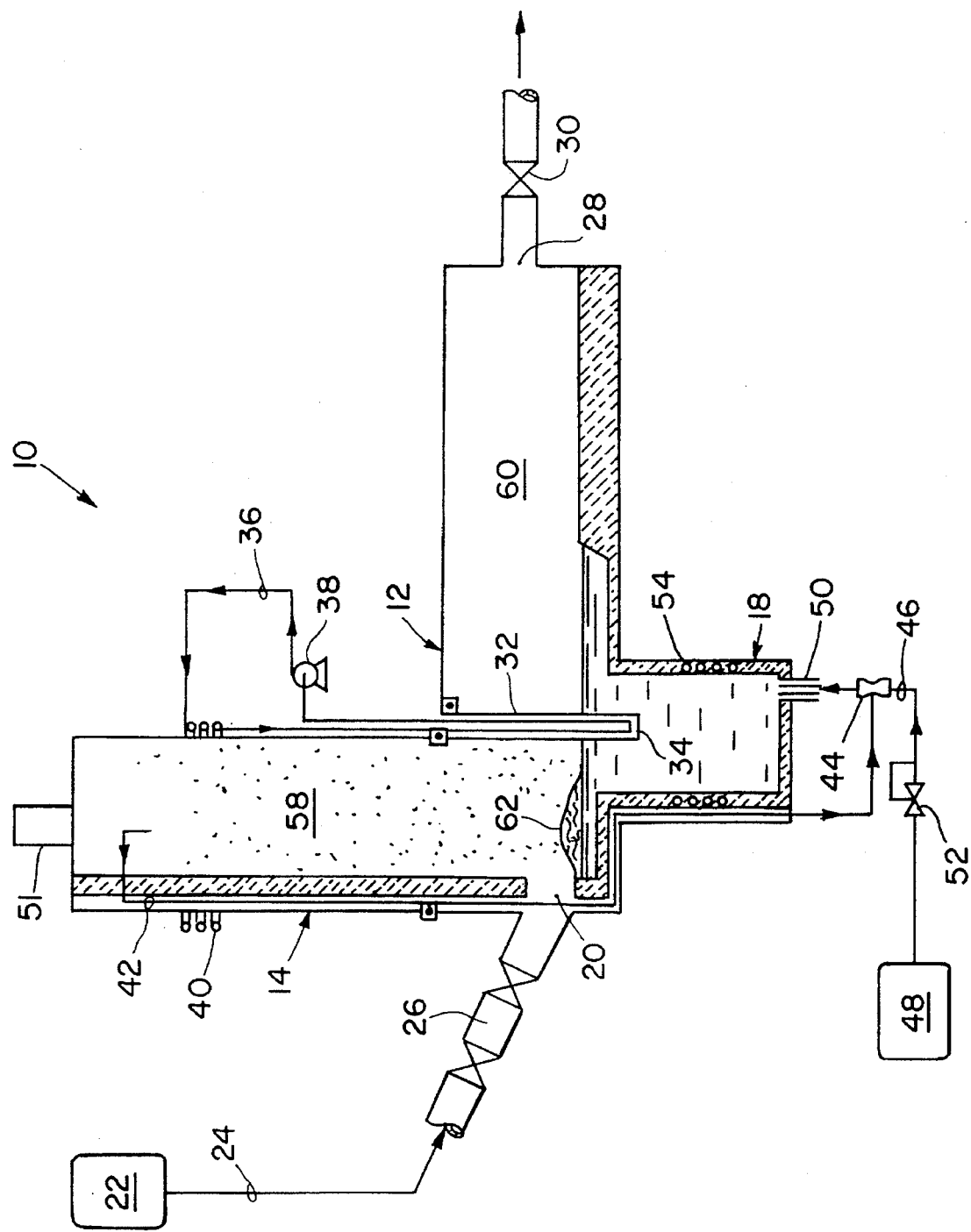

APPARATUS FOR DISSOCIATING BULK WASTE IN A MOLTEN METAL BATH

BACKGROUND OF THE INVENTION

Disposal of organic wastes in landfills and by incineration has become an increasingly difficult problem because of diminishing availability of disposal space, strengthened governmental regulations, and the growing public awareness of the impact of hazardous substance contamination upon the environment. Release of hazardous organic wastes to the environment can contaminate air and water supplies, thereby diminishing the quality of life in the affected populations.

To minimize the environmental effects of the disposal of organic wastes, methods must be developed to convert these wastes into benign, and preferably, useful substances. In response to this need, there has been a substantial investment in the development of alternate methods for suitably treating hazardous organic wastes. One of the most promising new methods is described in U.S. Pat. Nos. 4,574,714 and 4,602,574, issued to Bach and Nagel. The Bach/Nagel method for destroying organic material, including toxic wastes, involves decomposition of the organic material to its atomic constituents in a molten metal bath and reformation of these atomic constituents into environmentally acceptable products, including hydrogen, carbon monoxide and/or carbon dioxide gases.

Many hazardous wastes are bulk solids. These wastes can be directed into reactors containing molten metal baths by top loading them onto the baths. However, wastes directed onto molten metal baths often only partially decompose or volatilize before entering the baths. Consequently, these materials can be discharged with other gases exhausted from the reactors before destruction of the hazardous components of the wastes is complete. Alternatively, solid wastes can be pretreated, such as by forming the wastes into fluidized particulate streams and then injecting the streams beneath the surface of molten metal baths through tuyeres. However, pretreatment of solid hazardous wastes requires additional handling and can be time consuming and expensive.

Therefore, a need exists for an apparatus for dissociating bulk waste in a molten metal bath which overcomes the above-referenced problems.

SUMMARY OF THE INVENTION

The present invention relates to a reactor for dissociating bulk waste in a molten metal bath.

The reactor includes a bulk waste inlet and a gas outlet. A baffle within the reactor has a lower edge which can be immersed by a molten metal bath within the reactor. The baffle partitions a gaseous volume above the molten metal bath into a first region, proximate to the bulk waste inlet, and a second region, proximate to the gas outlet. A gas conduit extends from the first region to a portion of the reactor which is beneath the second region. Suitable means direct gas from the first region through the gas conduit into a portion of the molten metal bath beneath the second region, thereby equalizing gas pressure above the molten metal bath in the first and second regions during dissociation of the bulk waste directed into the first region.

The present invention has many advantages. For example, bulk solid wastes can be top-charged into a reactor which contains a molten metal bath, without discharge of partially decomposed components from the reactor. Therefore, no pretreatment of the waste is required, such as forming the waste into a fluidized particulate stream for submerged injection into the molten metal bath. Also, the first region contains gases above a portion of the molten metal bath where waste is top-charged. At least a portion of these gases are directed from the first region through a conduit for submerged injection of the gases into the molten metal bath beneath the second region. Particulates rising from the gas above the top-loaded waste in the first region will also drop back down into the bath for treatment within the molten metal bath. Therefore, all bulk waste top-loaded onto the molten metal bath passes through the molten metal bath in some form, such as a gas or solid, before being discharged from the reactor. Consequently, bulk solid wastes can be more completely decomposed in the molten metal bath without requiring pretreatment.

BRIEF DESCRIPTION OF THE DRAWING

The FIGURE is a cut-away side elevational view of one embodiment of a reactor of the invention, containing a molten metal bath suitable for decomposing bulk solid wastes directed into the reactor.

DETAILED DESCRIPTION OF THE INVENTION

The features and other details of the apparatus of the invention will now be more particularly described with reference to the accompanying drawing and pointed out in the claims. It will be understood that the particular embodiments of the invention are shown by way of illustration and not as limitations of the invention. The principle function of this invention can be employed in various embodiments without departing from the scope of the present invention.

The present invention generally relates to a reactor for dissociating bulk wastes in a molten metal bath. U.S. Pat. No. 5,301,620 and U.S. Ser. No. 08/041,405 teach methods and apparatus for dissociating wastes in reactors which include either a baffle or a refractory-packed bed to ensure contact between waste and a molten metal bath within each of the reactors. The teachings of U.S. Pat. No. 5,301,620 and U.S. Ser. No. 08/041,405 are incorporated herein by reference.

One embodiment of the invention is shown in the FIGURE, as apparatus 10. Apparatus 10 includes reactor 12. Reactor 12 includes vertical section 14 and horizontal section 16 extending from a lower portion of vertical section 14. Connecting section 18 of reactor 12 extends beneath the juncture of vertical section 14 and horizontal section 16.

Reactor 12 also includes bulk waste inlet 20 at a lower portion of vertical section 14. Bulk waste inlet 20 is suitable for directing bulk waste, such as bulk solid waste, from waste source 22 and conduit 24 into reactor 12 at the lower portion of vertical section 14. Conduit 24 is connected to bulk waste inlet 20 by lock hopper 26.

Gas outlet 28 is located at horizontal section 16 of reactor 12 in a position that is outward of the juncture of vertical section 14 and horizontal section 16. Back pressure control valve 30 is attached to gas outlet 28 for controlling gas pressure within vertical section 14.

Baffle 32 extends within reactor from the juncture between vertical section 14 and horizontal section 16 into connecting section of reactor 12. Baffle 32 includes lower edge 34. A baffle cooling system includes conduit 36 which extends within baffle 32 and which is connected to pump 38 and coil 40 at vertical section 14. A suitable heat transfer medium is recirculated through the baffle cooling system to transfer heat from baffle 32 to an upper portion of vertical section 14 by activation of pump 38.

Gas conduit 42 extends from upper portion of vertical section 14 to venturi tube 44. Conduit 46 extends from gas source 48 to tuyere 50 and includes venturi tube 44. Gas conduit 42 and venturi tube 44 are configured to cause gas to be directed from upper portion of vertical section 14 through gas conduit 42 and into connecting section 18 through tuyere 50 when gas is directed from gas source 48 through conduit 46 to tuyere 50. Pressure regulator 52 is located at conduit 46 to control the rate at which gas is directed from gas source 48 into reactor 12 through tuyere 50 and thereby control the rate at which gas is directed from vertical section 14 through gas conduit 42 into connecting section 18.

Heater 51 is located at an upper portion of vertical section 14. Heater 51 is suitable for maintaining the temperature of gas above molten metal bath 56 in vertical section 14 at about the same temperature as that of molten metal bath 56. Examples of suitable heaters include a plasma torch, an oxyfuel burner, etc.

Induction coil 54 is disposed at connecting section 18 for heating reactor 12 and for initiating generation of heat within reactor 12. It is to be understood that, alternatively, reactor 12 can be heated by other suitable means, such as by oxyfuel burners, electric arc, etc.

Molten metal bath 56 can be formed by at least partially filling reactor 12 with a suitable metal. The metal is then heated to a suitable temperature by activating induction coil 54 or by other means, not shown. Typically, the temperature to which the metal is heated in reactor 12 is a temperature in the range of between about 1,350° C. and about 1,600° C. Lower edge 34 of baffle 32 is immersed in molten metal bath 56. The upper surface of molten metal bath 56 in vertical section 14 is lower than bulk waste inlet 20. The upper surface of molten metal bath 56 in horizontal section 16 of reactor 12 is below gas outlet 28. Immersion of lower edge 34 of baffle 32 in molten metal bath 56 partitions the gas space above molten metal bath into first region 58, proximate to bulk waste inlet 20, and second region 60, proximate to gas outlet 28.

Molten metal bath 56 is suitable for dissociating bulk wastes, such as bulk solid wastes that include organic components, to their elemental constituents, such as carbon and hydrogen. Examples of suitable metal components of molten metal bath 56 include iron, copper, nickel, etc. Molten metal bath 56 can include a plurality of molten metal components. These components can be miscible or immiscible at the operating conditions of apparatus 10.

Optionally, vitreous layer 62 can be disposed on the upper surface of molten metal bath 56 in vertical section 14 or horizontal section 16 of reactor 12. In one embodiment, vitreous layer 62 is disposed on top of molten metal bath 56 in both vertical section 14 and horizontal section 16 of reactor 12.

In one embodiment, vitreous layer 62 has a lower thermoconductivity than that of molten metal bath 56. Radiant loss of heat from molten metal bath 56 can thereby be reduced to significantly below the radiant heat loss from molten metal bath 56 when no vitreous layer is present.

Examples of suitable metal oxides of vitreous layer 62 include titanium oxide ($TiO_2$), zirconium oxide ($ZrO_2$), aluminum oxide ($Al_2O_3$), magnesium oxide (MgO), calcium oxide (CaO), silica ($SiO_2$), etc. Other examples of suitable components of vitreous layer 62 include halogens, sulfur, phosphorous, heavy metals, etc. It is to be understood that vitreous layer 62 can include more than one metal oxide. Typically, vitreous layer 62 is substantially fluid and free radicals and other gases can pass across vitreous layer 62 from molten metal bath 56.

Bulk waste in solid or liquid form is directed from waste source 22 through bulk waste inlet 20 into vertical section 14 of reactor 12. Generally, the waste includes organic compounds, such as alkenes, alkanes, etc. The waste can be directed into reactor 12 as whole articles, such as paper products, lumber, tires, coal, whole steel drums and their contents, etc. It is to be understood that suitable examples of waste which can be treated include inorganic compositions. Suitable examples of inorganic wastes include, but are not limited to, wastes which include metals and their oxides, sulfides and halides. In addition to carbon, feed can include other atomic constituents, such as hydrogen, halides, metals, etc.

The waste directed into reactor 12 combines with molten metal bath 56 and can also combine with vitreous layer 62. Contact of the waste with molten metal bath 56 or vitreous layer exposes the waste to conditions which decompose at least a portion of the components in the waste.

Decomposition of the waste in vertical section 14 causes a portion of the decomposition products, such as elemental constituents of the feed, to dissolve in vitreous layer 62 or in molten metal bath 56. As waste and decomposition products of the waste accumulate in vertical section 14, dissolved decomposition products migrate in molten metal bath 56 from vertical section 14 through connecting section 18 to the portion of molten metal bath 56 within horizontal section 16 of reactor 12.

Other components of the waste, such as volatilizable waste components and partially decomposed waste components, volatilize in vertical section 14 and accumulate in first region 58. Baffle 32 prevents direct migration of volatilized waste components from the first region 58 to second region 60. Introduction of waste into vertical section 14 through bulk waste inlet 20 is continued and, as volatilized waste and decomposition products continue to be generated in vertical section 14, these volatilized materials accumulate in first region 58. Although, as shown, vertical section 14 extends above the height of horizontal section 16, to reduce the effect of gas accumulation on total gas pressure within first region 58, it is to be understood that the top of vertical section 14 can be level with the top of horizontal section 16.

The uniformity of temperature in first region 58 can be maintained by activating pump 38 to thereby cause recirculation of the heat transfer medium within conduit 36 and coils 40. Heat absorbed by the heat transfer medium from the molten metal bath 56 as the heat transfer medium is conducted through baffle 32 is transferred through conduit 36 by pump 38 to coils 40 at vertical section 14, thereby heating the gas above molten metal bath 56 within first region 58. The rate of heat transfer from baffle 32 to coils 40 can be sufficient to prevent volatilized components in first region 58 from condensing as the volatilized components migrate away from molten metal bath 56.

A suitable gas, such as a relatively inert gas, is directed from pressurized gas source 48 through conduit 46, including venturi tube 44, and through tuyere 50 into connecting section 18 of reactor 12. The gas is thereby directed by submerged injection into molten metal bath 56 into a portion of connecting section 18 which is directly beneath the portion of molten metal bath 56 within horizontal section 16.

Gas is directed from vertical section 14 through line 42 and is combined with gas from pressurized gas source 48 by direction of the gas from pressurized gas source 48 through venturi tube 44. Gas directed through tuyere 50 into molten metal bath 56 beneath horizontal section 16 migrates upwardly through molten metal bath 56 toward second region 60. Partially decomposed waste and volatilized waste components directed from vertical section 14 through conduit 42 and tuyere 50 into molten metal bath 56 decompose during exposure to molten metal bath 56 in connecting section 18.

Gases which accumulate in second region 60 include gases which are generated by decomposition of feed in molten metal bath 56 at vertical section 14 and which have migrated through molten metal bath 56 from vertical section 14 through connecting section 18 and beneath baffle 32 to horizontal section 16. The gases in second region 60 also include gases which are formed by decomposition of volatilized waste and partially decomposed waste components which have been injected into molten metal bath 56 at connecting section 18 through tuyere 50. Therefore, essentially all of the decomposition products of the bulk waste are directed to second region 60.

The rate at which gas is directed from pressurized gas source 48 through venturi tube 44 and tuyere 50 into molten metal bath 56 is determined by pressure regulator 52. Pressure regulator 52, in turn, is controlled by the relative pressures within first region 58 and second region 60. In one embodiment, the rate of flow of gas from pressurized gas source 48 through venturi tube 44 and tuyere 50 into molten metal bath 56 is sufficient to cause gas to be directed from vertical section 14 at a rate which substantially equalizes the pressure in first region 58 and second region 60. Equalization of gas pressures in the first region 58 and second region 60 substantially reduces stress on baffle 32 caused by accumulation of volatilized waste and partially decomposed waste components in first region 58. Also, equalization of gas pressures in first region 58 and second region 60 prevents blow-through of undecomposed and partially decomposed waste components beneath lower edge 34 of baffle 32 into horizontal section 16.

Gas pressure above molten metal bath 56 in horizontal section 16 is controlled, at least in part, by controlling back-pressure control valve 30. Gaseous decomposition products, such as carbon monoxide and hydrogen gas, formed from the bulk waste directed into reactor 12 through bulk waste inlet 20, is discharged from reactor 12 through gas outlet 28 and back-pressure control valve 30. Migration of decomposition products from connecting section 18 into horizontal section 16 causes the decomposition products to migrate along molten metal bath 56 within horizontal section 16 and to escape from molten metal bath 56 into second region 60.

Gases discharged from reactor 12 through gas outlet 28 and back-pressure control valve 30 are suitably treated before being released to the atmosphere. Examples of suitable treatment include cooling, scrubbing and appropriate filtration.

EQUIVALENTS

Those skilled in the art will recognize, or be able to ascertain using no more than routine experimentation, many equivalents of the invention described specifically herein. Such equivalents are intended to be encompassed in the scope of the following claims.

We claim:

1. A reactor for dissociating bulk waste in a molten metal bath, comprising:

a) a bulk waste inlet;

b) a gas outlet;

c) a baffle within said reactor, said baffle having a lower edge which can be immersed by a molten metal bath within said reactor, whereby the baffle partitions a gaseous volume above the molten metal bath into a first region, proximate to said bulk waste inlet, and a second region, proximate to said gas outlet;

d) a gas conduit extending from said first region to a portion of said reactor beneath the second region; and e) means for directing gas from the first region through the gas conduit into a portion of the molten metal bath beneath the second region, thereby equalizing gas pressure above the molten metal bath in the first and second regions during introduction of bulk waste into the first region.

2. The reactor of claim 1, further including a back-pressure control valve at the gas outlet, for controlling gas pressure within the second region above the molten metal bath in the reactor.

3. The reactor of claim 2, wherein the means for directing gas from the first region to said portion of the molten metal bath beneath the second region includes a venturi tube and a pressurized gas source.

4. The reactor of claim 3, wherein the first region extends vertically to an elevation above that of the second region.

5. The reactor of claim 4, further including means for cooling the baffle.

6. The reactor of claim 5, further including means for heating the first region.

7. The reactor for claim 6, wherein the means for cooling the baffle and the means for heating the first region include a heat transfer tube extending from the baffle to the first region, whereby a liquid medium recirculating through the heat transfer tube can transfer heat from the baffle to the first region thereby cooling the baffle and heating the first region.

8. In a reactor which includes a bulk waste inlet and a gas outlet, and which is suitable for containing a molten metal bath:

the improvement comprising a baffle which partitions a gas volume above the molten metal bath into a first region, proximate to the bulk waste inlet, and a second region, proximate to the gas outlet, a gas conduit extending from said first region to a portion of the reactor beneath the second region, and means for directing gas from the first region through the gas conduit into a portion of the molten metal bath beneath the second region, thereby equalizing gas pressure above the molten metal bath in the first and second regions during introduction of bulk waste into the first region.

* * * * *